United States Patent [19]

Hanauer

[11] Patent Number: 4,941,433

[45] Date of Patent: Jul. 17, 1990

[54] MILKING METHOD AND RELATED APPARATUS

[75] Inventor: George E. Hanauer, Brookfield, Conn.

[73] Assignee: Agri-Automation Company, Ltd., Brookfield, Conn.

[21] Appl. No.: 197,951

[22] Filed: May 23, 1988

[51] Int. Cl.$^5$ .............................................. A01J 5/00
[52] U.S. Cl. .............................. 119/14.02; 119/14.08; 119/14.1; 119/14.47; 119/14.54
[58] Field of Search .................. 119/14.1, 14.02, 14.03, 119/14.08, 14.11, 14.14, 14.13, 14.18, 14.47, 14.48, 14.49, 14.50, 14.51, 14.52, 14.53, 14.54, 14.55, 14.04, 14.01

[56] References Cited

U.S. PATENT DOCUMENTS

| | | | |
|---|---|---|---|
| 1,184,632 | 5/1916 | De Leon | 119/14.48 |
| 1,249,345 | 12/1917 | Davidson | 119/14.1 |
| 2,512,926 | 6/1950 | Finn | 119/14.1 |
| 2,670,709 | 3/1954 | Stampen | 119/14.52 |
| 4,000,718 | 1/1977 | Brown | 119/14.03 |
| 4,010,714 | 3/1977 | Notsuki et al. | 119/14.03 |
| 4,141,319 | 2/1979 | Maier et al. | 119/14.47 |
| 4,223,635 | 9/1980 | Akerman | 119/14.02 |
| 4,249,481 | 2/1981 | Adams | 119/14.02 |
| 4,508,058 | 4/1985 | Jakobson et al. | 119/14.02 |
| 4,537,152 | 8/1985 | Thompson | 119/14.52 |
| 4,572,106 | 2/1986 | Mills | 119/14.47 |
| 4,685,422 | 8/1987 | Middle et al. | 119/14.13 |
| 4,748,936 | 6/1988 | Hogen Esch | 119/14.02 |

FOREIGN PATENT DOCUMENTS

| | | | |
|---|---|---|---|
| 0209202 | 1/1987 | European Pat. Off. | 119/14.47 |
| 82592 | 6/1971 | German Democratic Rep. | |
| 8500270 | 1/1985 | Int'l Pat. Institute | 119/14.54 |

OTHER PUBLICATIONS

Dieter Ordloff, Fed. Dairy Research Center, Kiel, West Germany, 35 Land Ternir, pp. 222–224 (1980), Investigations on a System for Automatic Teat Cup Attaching.

Primary Examiner—Robert W. Bahr
Attorney, Agent, or Firm—Mattern, Ware, Stoltz & Fressola

[57] ABSTRACT

Milking machine methods and apparatus facilitating automatic attachment to the dairy cow's udder, incorporate upstanding thin-walled flexible conical teat cup entrance portals, with the four teat cups preferably positioned upright in a trapezoidal configuration, free for lateral and longitudinal movement horizontally, while resisting vertical displacement. Leaf-spring retainer arms positioned vertically edgewise provide resilient adjustable teat cup positioning. A claw manifold guides milk received from the teat cups in laminar flow streams, minimizing foaming turbulence. A robotic manipulator may be used to attach these milking machines to the udders of a plurality of dairy cows.

45 Claims, 8 Drawing Sheets

FIG. 7
(PRIOR ART TEAT CUP)

MILKING METHOD AND RELATED APPARATUS

This invention relates to automatic machines for milking cows, and more particularly to methods and apparatus to facilitate milking machine attachment and achieve production economies in a variety of milking parlor configurations.

Several novel features characterize the invention. An enlarged conical teat entrance portal to each teat cup or "inflation" facilitates teat cup placement on the teat, provides a massaging stimulus to the udder which induces and accelerates milk let down, and further, inhibits the teat cup from climbing the teat and restricting milk flow through the lactiferous duct. A teat cup attaching means or cluster support mechanism retains four teat cups upright in a generally trapezoidal relationship to each other and permits adjustment of said teat cups, positions prior to attachment while also allowing said teat cups to align themselves on the teats during simultaneous attachment, which may be performed automatically. The milk collecting manifold or "claw" is characterized by the novel feature that the inlets are disposed near the opposing ends and in a reverse orientation from the prior art, diverging in such a manner that the milk entering the claw inlet nipples flows towards the ends of said claw. The claw inlet nipples permit teat cup placement on the udder to conform to the natural udder configuration and development and remain perpendicular to the horizontal plane without the customary vacuum leakage and pre-mature fall-off characterizing prior art devices. Computer controlled automatic powered means place said teat cup support mechanism (with said teat cups) on the cows' teats, and remove the device from the udder when milking is completed.

BACKGROUND OF THE INVENTION

The milking of cows has become highly automated in recent years. Pipeline milkers operating on a common vacuum source are commonplace. Automatic milking machine detachers, electronic cow identification systems, and computer operated feeding stations are gaining wide acceptance as dairymen work to improve productivity and efficiency.

Placing the milking machine on the cow however has remained essentially unchanged. The milker grasps the machine's claw carrying four teat cups in one hand, and with his other hand individually places each of the four teat cups on the cow. This method requires great dexterity and complex physical motions. Since cows are prone to kick, the work is sometimes dangerous, in addition to being dirty drudgery.

Numerous attempts to automate milking machine attachment have been documented. Yet, commercial success has eluded all efforts to date. The complex nature of the task is largely responsible. Tremendous variations occur between cows with respect to udder conformation, teat locations, size and orientation which previously presented great obstacles to the achievement of automation economies.

BRIEF SUMMARY OF THE INVENTION

The objective of the invention is to provide methods and apparatus for placing the milking machine on the udder in a fast, simple, physiologically advantageous manner, taking full advantage of the animal's lactation process and instinctive reactions. This provides economic benefits through rapid attachment, accelerated milking, and reduced milker fall-off when used in a semi-automatic milking machine attachment mode and it also facilitates fully automatic attachment.

The invention provides a novel teat cup with an enlarged conical teat entrance portal for use in the method, a unique teat cup attaching means which cooperates with said teat cups to facilitate the teat cups' compliance to the broad spectrum of size variations among cow udders, and achieves simultaneous attachment of all four teat cups, employing a novel claw characterized by diverging orientation of the inlet nipples, which is a reversal as compared to prior art claw devices. These devices are movably mounted on support machinery to carry out the method in an automated manner, each said device being mutually cooperative in the method and, also, independently applicable.

According to the first aspect of this invention, the teat cup is a rigid, hollow shell with a flexible inner liner, referred to as an "inflation" in the trade. The teat is placed into the teat cup and vacuum is applied both to the teat end in the inflation for milk evacuation, and intermittently between the rigid shell and the flexible inflation, to alternately squeeze and release the teat in a massaging fashion. The present invention is characterized by the novel feature of an enlarged conical entrance portal projecting upwards from the relatively small inflation orifice.

This enlarged conical entrance portal comprises a flexible section above the inflation orifice and a more rigid section at or below the upper rim. It functions as a receiver and guide for the teat to direct the teat into the small inflation orifice, thus reducing the precision required by the prior art. The conical entrance portal flexes and partially compresses vertically downward during attachment to the teat, and gently massages the udder during milking in a manner similar to the natural action of a sucking calf. This massaging action stimulates the cow's hormonal system, causing the mammary gland to release milk into the teats and subsequently into the teat cups for evacuation. The conical entrance portal further inhibits the teat cup from ascending the teat and consequently restricting milk flow through the lactiferous duct.

A second aspect of this invention, the claw, is a rigid, hollow, manifold device comprising a milk receiving chamber connected to a plurality of teat cups via inlet nipples affixed to said chamber, and suction tubes operatively connecting the inlet nipples with said teat cups. An outlet port from said chamber is connected to a suction tube, to evacuate the milk from said chamber and transport the milk to a storage device. The present invention is characterized by a reverse orientation of said inlet nipples as compared to the prior art devices, such that the inlet nipples are positioned to direct the milk entering through said inlet nipples towards the opposite ends of said chamber, and the milk entering the chamber at the end nearest said outlet port is immediately evacuated while the milk entering said chamber at the opposite end is redirected down the length of said chamber and to said outlet port. Means are also provided to remove and apply vacuum to all or some of the teat cups collectively and independently.

A third aspect of this invention provides an attaching mechanism to support the four teat cups in an upright position, in a generally trapezoidal relationship to each other, comprising resilient support means for each teat cup with teat cup retaining elements at their extremities.

The resilient support means deflects upon actuation of an adjustment means to reposition the teat cups relative to one another. The teats entering the conical entrance portals likewise deflect the support means, facilitating the ready positioning of the teat cups on the teats for simultaneous and automatic attachment.

The invention provides, in another aspect, a powered means for placing said teat cups and said teat cup attaching mechanism on the cow's udder comprising powered means to position said teat cup attaching means and attach said teat cups onto the udder, a means for holding said teat cup attaching mechanism and subsequently releasing it after attachment of said teat cups onto the teats has been effected, and sensing means in the form of an ultrasonic transducer and receiver system to measure the positions of the cow and/or her teats and udder, and vacuum sensors and vacuum regulating means for the teat cups. Finally, a computer controller is employed to communicate with and control the position sensing means, the vacuum sensing means, and the vacuum regulating means, and to actuate the powered means in order to compare the teat positions with those designated in the control program, and to effect attachment of the teat cups to the teats. Said powered means is movable within the milking parlor to attach a plurality of said teat cup attaching mechanisms with said teat cups on a plurality of cows' udders. Conventional detacher devices may be used to remove the milking machine following milking, and standard electronic cow identification means are useful to communicate with the computer/controller means to signal the presence and location of cows to be milked.

Means may also be provided for the powered means to clean and massage the teats prior to teat cup attachment for milking, and to apply disinfectant to the teats after milking machine removal.

OBJECTS

Accordingly, a principal object of the invention is to provide methods and apparatus for automated milking of cows which is achieve automatic attachment of the teat cups to the cow's udder, eliminating the need for manual attachment by a human operator.

Another object of the invention is to provide such apparatus and techniques incorporating ultrasound position-finding sensor systems guiding the teat cups into engagement position below the cow's udder.

A further object is to provide such apparatus incorporating compliant resilient attaching means maintaining the teat cups in a substantially horizontal plane, resisting deflection therefrom, while providing ready maneuverability of the teat cups laterally and longitudinally for self-guided resilient engagement with the cow's udder.

Still another object is to provide such apparatus including adjustable attaching means capable of positioning four teat cups upstanding with their axes defining the four apices of a trapezoid, adapted for moving the teat cup axes together and apart to change the dimensions of the trapezoid.

A further object is to provide such apparatus equipped with automatic adjustment means for changing the dimensions of the trapezoid upon command.

Another object is to provide such apparatus with enlarged conical-entrance portals having conical walls of varying thickness, with at least one relatively thick portion to maintain annular shape, prevent riding up and maintain the flow of milk, and at least one thinner portion capable of flexing partial collapse, massaging the cow's udder and promoting milk flow through milking action emulating that of a sucking calf.

Still another object is to provide such apparatus incorporating an elongated milk collecting manifold claw chamber with non-radial nipple connections directing incoming milk streams flowing from each teat cup in converging pairs aimed toward opposite longitudinal ends of the chamber, with an outlet at one chamber end receiving one converging pair of streams, and stream-guiding milk diverting means re-directing the other pair of converging streams toward the outlet at the other end of the chamber, minimizing foaming turbulence and promoting smooth laminer streamline milk flow.

A further object of the invention is to provide such apparatus incorporating automatically controlled means for raising and lowering the teat cups, moving them into position beneath a cow, and moving them forwardly into milking position beneath the cow's udder for engagement and rearwardly after milking is completed and the teat cups are disengaged.

Another object of the invention is to provide novel milking methods capable of eliminating the need for individual manual attachment of milk cups to the cow's teats by achieving simultaneous attachment of a plurality of teat cups during the same attachment operation.

Still another object is to achieve such simultaneous teat cup attachment automatically.

An additional object is to provide automatic milking methods achieving increased milk production by automatic massaging stimulation of the cow's mammary tissue during the automatic milking operation.

Other objects of the invention will in part be obvious and will in part appear hereinafter.

The invention accordingly comprises the features of construction, the combinations of elements, and the arrangements of parts which will be exemplified in the constructions hereinafter set forth, and the scope of the invention will be indicated in the claims.

For a fuller understanding of the nature and objects of the invention, reference should be made to the following detailed description taken in connection with the accompanying drawings.

THE DRAWINGS

FIGS. 11 and 12 are further enlarged fragmentary cross-sectional elevation views of a teat cup incorporated in another embodiment of this invention. FIG. 12 shows the conical entrance portal partially collapsed in massaging engagement with the cow's udder.

GENERAL DESCRIPTION

Figure 1:
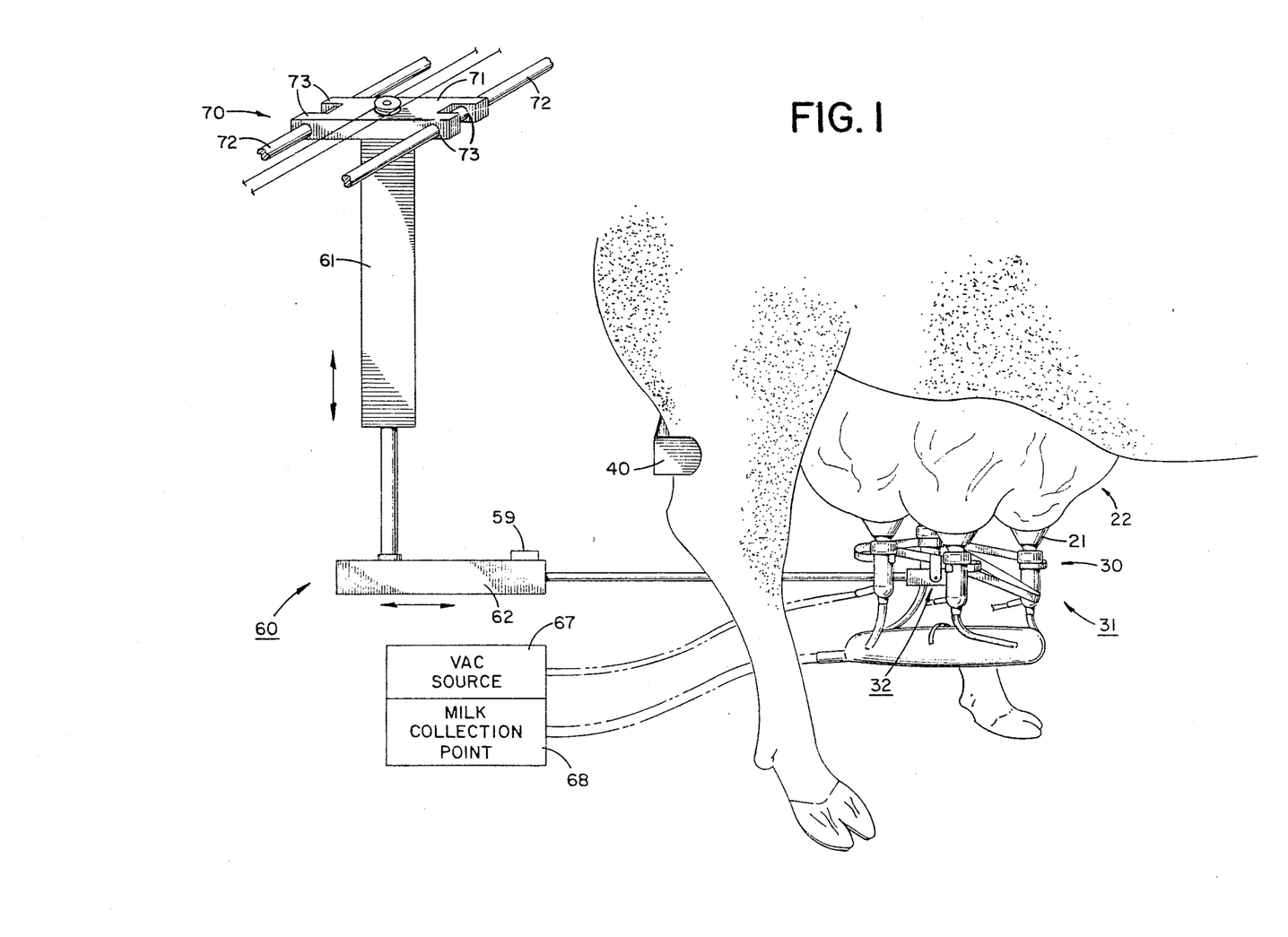
FIG. 1 is a schematic perspective side view of the rear end of a milking stall, showing a milking machine of the invention deployed with its teat cups engaged on the cow's udder by attaching means positioned by a robotic manipulator.
Figure 4:
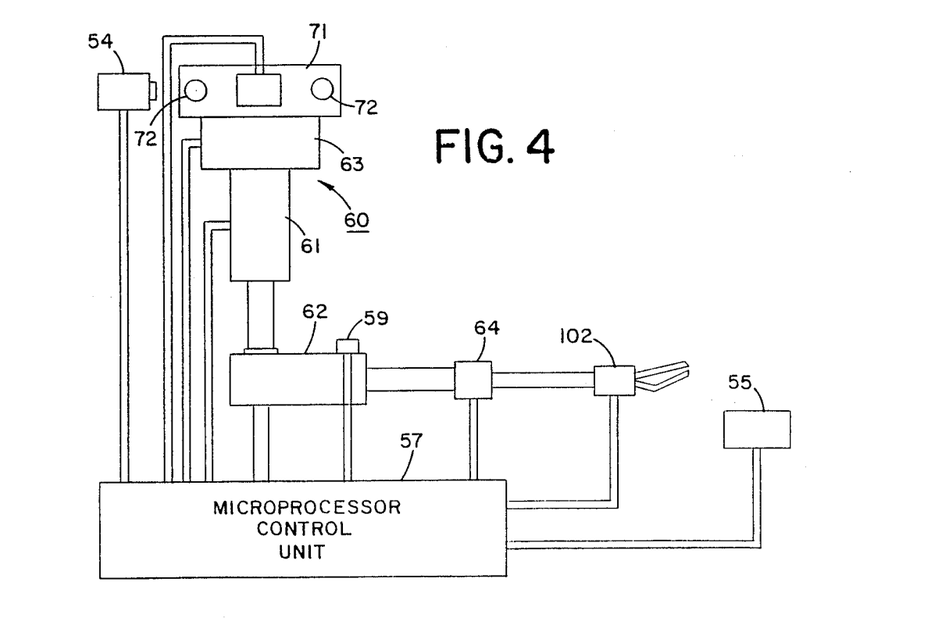
FIG. 4 is a schematic block diagram of the control circuitry, sensors and drive mechanisms incorporated in the automatic milking machines and manipulators of this invention.

FIGS. 1 and 4 depict a cartesian robotic manipulator 60 in the attachment position and supporting the teat cup attaching mechanism 30 with teat cups 21 and claw 20 under a cow's udder 22. The method and apparatus of the invention are applicable to different milking parlor configurations, and are therefore shown generically.

The milking means 31 incorporating teat cups 21 and attaching mechanism 30 are supported by the manipulator 60 in a gripping means 23 and are presented to the udder between the animal's hind legs as shown in FIG. 1. This is the preferable approach method in that the cow can be restrained from kicking the devices by a retaining bar mechanism 40 placed in contact with the soft muscles above the stifles. Said retaining mechanism 40 also restricts lateral and longitudinal movement and forces the legs apart forward, permitting easier access to the udder 22. Depending on the parlor type to which the method is adapted, additional devices can be fitted to the stalls to further inhibit cow movement, such as mechanical means in contact with the animal's midsection and brisket.

Figure 6:
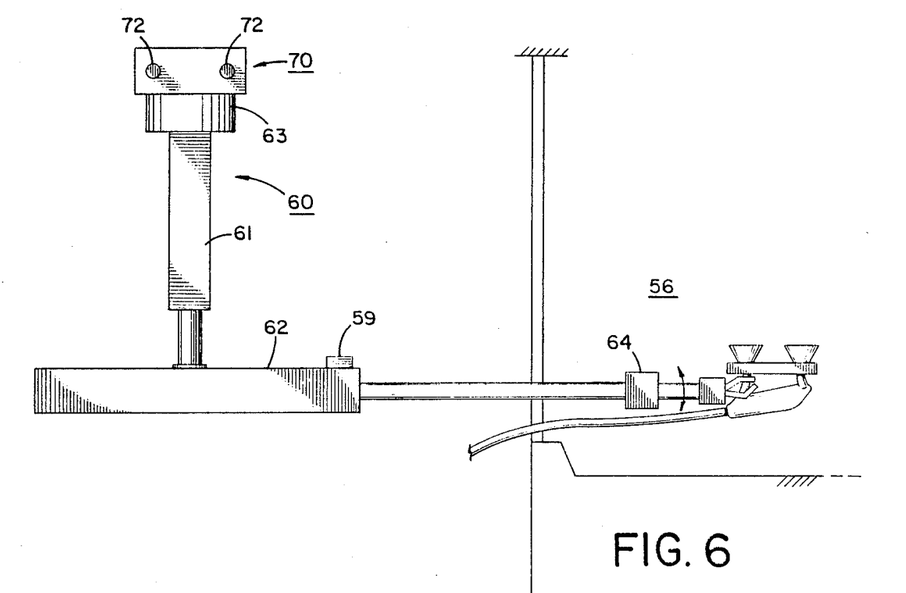
FIG. 6 is a similar schematic side elevation view of another embodiment of the invention, incorporating a rotary table as its basic support component, connected by vertical and horizontal linear translation components to the attaching assembly.

The robot manipulator 60 comprises two linear motion components or actuators 61 and 62, which provide vertical and horizontal motion, respectively, enabling the manipulator 60 to raise and lower the milking means 31 carrying teat cups 21 and to position said means along the longitudinal centerline of the cow. The manipulator 60 may also incorporate one or more pivoting or rotational actuators, such as a yaw actuator 63 and a pitch actuator 64 (FIG. 4), providing rotary motions, for rotation respectively about a vertical yaw axis and a horizontal pitch or bend axis through the wrist 65, as shown in FIG. 6. It is also possible if desired to locate the rotatable joints at either end of the vertical linear component 61 and thereby reduce the amount of mechanism under the cow, but more precise positioning is achieved for each individual teat cup 21 when they are maneuvered independently, directly below udder 22.

Reduced pressure from a vacuum source 67 is applied pulsingly to teat cups 21, delivering milk via a suction hose 84 to a milk collection point 68.

Figure 3:
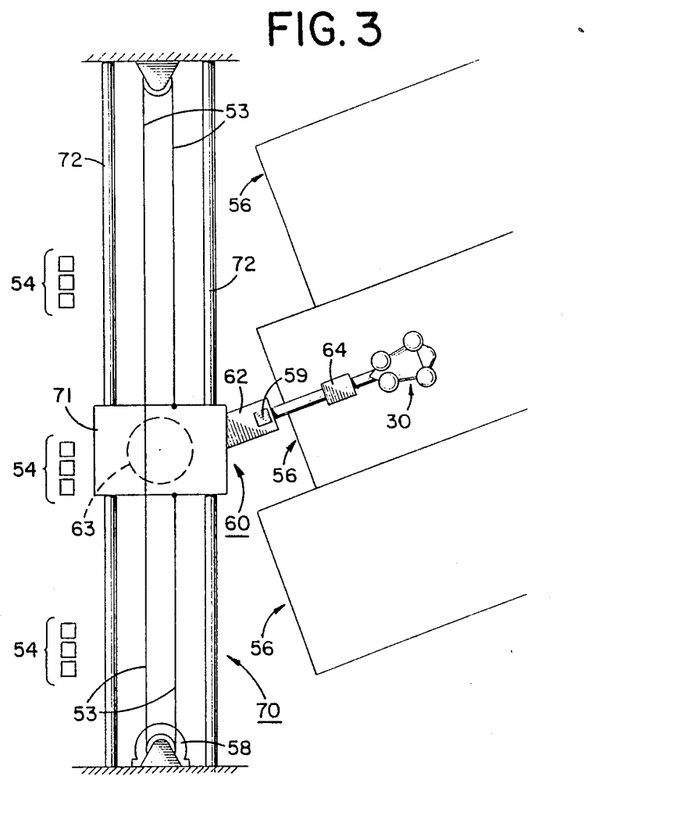
FIG. 3 is a fragmentary schematic view of one row 1. of stalls in a herringbone pattern milking parlor, showing the automated milking machine of FIG. 1 with its claw and teat cup attacher deployed for milking in the central stall of the row.

FIGS. 1 and 3 also illustrate a track device 70 to provide a linear motion to reposition the manipulator 60 behind a series of cows in a row, such as in a herringbone or parallel milking parlor. The robot can thus grip, move and attach milking means to a number of cows in succession, improving the economics of the invention.

Figure 2:
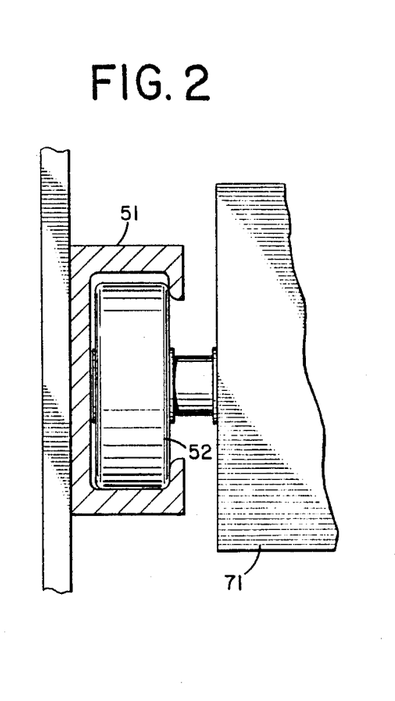
FIG. 2 is an enlarged fragmentary vertical cross-section of a track and roller assembly in a modified embodiment of the milking machine manipulator shown in FIG.

The track device 70 comprises a carriage 71 to which the manipulator 60 is mounted. Said carriage 71 slides or rolls on support rails 72 which may be cylindrical guide rails as shown in FIGS. 1 and 3. The carriage may slide via linear bearing blocks 73 encircling the cylindrical guide rails. As shown in FIG. 2, channel shaped structural members 51 can be used in place of the cylindrical rails 72, in which case the carriage 71 has a number of wheels or rollers 52 affixed to it that are guided in the channels. In either case, a cable, chain or timing belt 53 is connected to the carriage 71 and to suitable sprockets or drive pulleys 50 at the opposing longitudinal ends of the track device to pull or push the carriage upon command, actuated by a drive motor 58.

In the preferred embodiment, a rodless pneumatic or hydraulic cylinder provides power to the cable or similar device, although other power sources can be utilized. Sensors 54 are positioned along the track at each desired stopping position of the manipulator, i.e., at each cow stall 56. Said sensors 54 report the position of carriage 71 and therefore the manipulator 60 to a microprocessor control unit 57. Said control unit 57 is in communication with the drive motor 58 of the track and it actuates the drive motor to transport the carriage 71 and manipulator 60 to the appropriate position according to which sensor 54 input channel is then active.

The control unit 57 is also necessarily in communication with the manipulator 60. A program sequence, stored in the microprocessor's memory, instructs the manipulator 60 to carry out pre-defined motion sequences, unless an override input is received from an external source in communication with said control. Such modifying inputs may be received from: the operator activating stop buttons; safety sensor means; operation error detection within the control, powered means, or sensor circuitry.

The microprocessor unit 57 communicates with an ultrasonic distance measuring sensor means 59 mounted on the manipulator. Said sensor 59 is employed to measure the coordinate positions of the cow's teats relative to a reference datum and communicate these positions via analog signal input channels to the microprocessor unit 57. The microprocessor stores the teat locations for each individual cow in memory, calculates the appropriate motion path for the manipulator and the correct teat cup positions for attacher mechanism 30, and communicates this information to the manipulator to adapt its movement path and adjust the teat cup attacher mechanism 30 for attachment of the milking means to the cow's udder. The microprocessor 57 further monitors the actual path taken by the manipulator, and sends corrective instructions when required, such as when the cow changes position.

During attachment, said microprocessor unit 57 communicates with vacuum sensors 55, regulates the vacuum supply to the teat cups, and monitors vacuum and milk flow sensing means for each teat cup to validate successful attachment. The sequence can be repeated one or more times in the event of initial failure. The operator should be signalled after the second unsuccessful attempt to apply corrective action.

Interfacing to prior art electronic cow identification means can also be employed. In this case the microprocessor unit 57 receives communication signals from said cow identification means indicating the presence, location, and teat coordinate data for all cows entering the milking parlor. Since udder geometry varies throughout the cows' lactation period and with age, the control unit 57 controlling ultrasonic measuring sensor 59 is instructed to re-measure each cow's udder periodically. Between re-measurings, the manipulator operates on the previously recorded teat locations.

At the completion of milking, the robot manipulator 60 can remove the milking means 31 and apply disinfectant to the udder. Use can also be suitably made of prior art milking machine detachers adapted for use in the method. If desired, the robot may also clean the udder prior to milking by any of the available sanitizing techniques.

Figure 5:
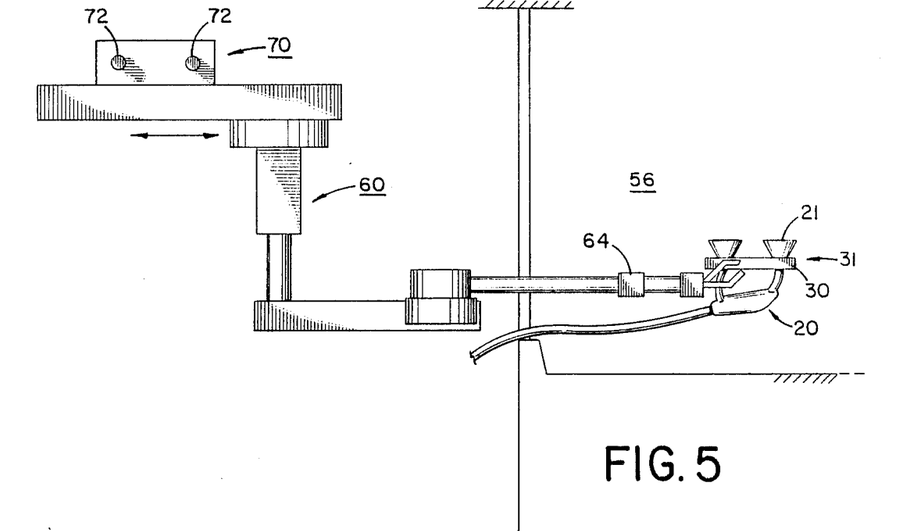
FIG. 5 is a schematic side elevation view of one embodiment of the present milking machine invention, incorporating a vertical linear translation component and horizontally pivoting means to move the teat cup attaching means into milking position beneath the cow's udder, with a horizontally pivoting mounting for the attaching assembly.

Other adaptations of the described method are possible to suit variations in milking parlor configurations. Attachment of the milking means 31 from the side of the cow can be accomplished using either a horizontally or vertically articulated manipulator. FIG. 5 depicts such a horizontally articulating device. Such manipulators are more appropriately applied in side opening and obliquely angled herringbone parlors, or in conjunction with free standing combination feeding and milking stalls where either one or two stalls may be served by a stationary manipulator.

FIG. 1 depicts the teat cup attacher mechanism 30 supported in the manipulator's gripping means 32. The attacher mechanism may be permitted to partially pivot about its lateral and longitudinal horizontal axes within the gripping means. Alternatively, either or both pivoting motions can be performed by the gripping means itself.

The teat cup 21 of the invention is depicted in FIGS. 8–12. It can be contrasted with the prior art configuration shown in FIG. 7, which comprises a rigid, hollow, cylindrical shell 34 with an elastic inner liner, or "inflation" 36, a rigid nipple 37 for attaching a pulsation tube 35 to shell 34, and a milk discharge tube 38.

Figure 8:
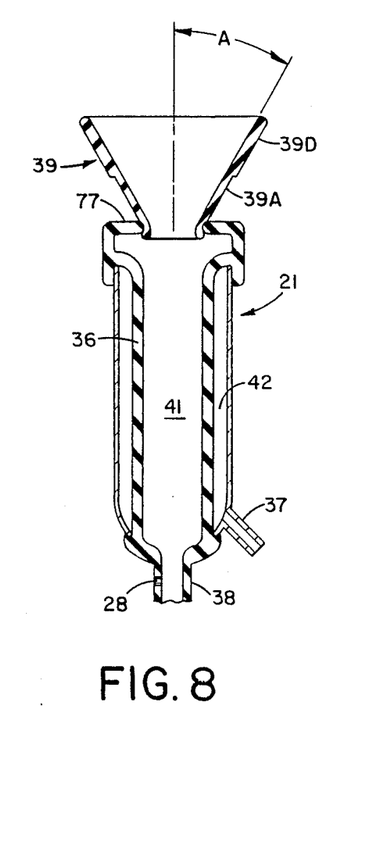
FIGS. 8, 9 and 10 are similar cross-sectional elevation views of a teat cup incorporated in different embodiments the present invention, with the cow's teat entering the distended teat cup in FIG. 9, and with the teat and udder shown in full milking engagement in FIG. 10.

The teat cups 21 of this invention each include a resilient conical teat entrance portal 39. The inner liner or "inflation" forms a tight seal with the shell at both its top and bottom ends in the usual manner to define two separate chambers, an inner milking chamber 41, encircled by an outer pulsing chamber 42. Vacuum from source 67 (FIG. 1) is applied to pulsing chamber 42 through the pulsation tube 35 and nipple 37 to cause the liner 36 to distend outwards against the rigid shell 34, and is alternately released to squeeze the teat for milk extraction. Suction applied to the discharge tube 38 removes the milk from the liner 36, aided by a small air vent 28 formed in tube 38 if desired, as shown in FIG. 8.

Figure 11:
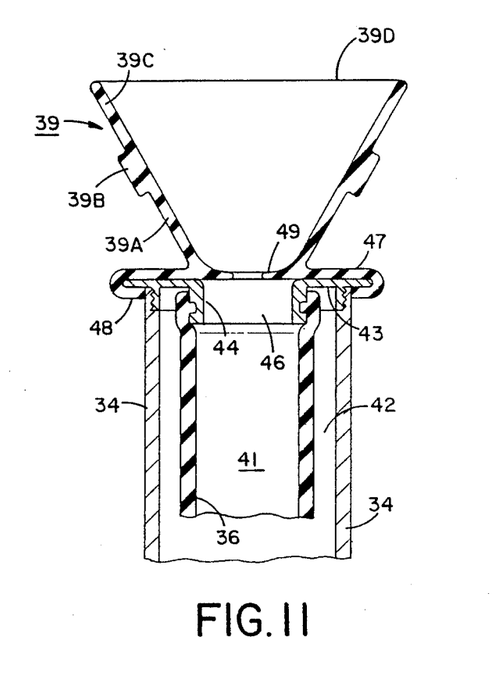
Figure 12:
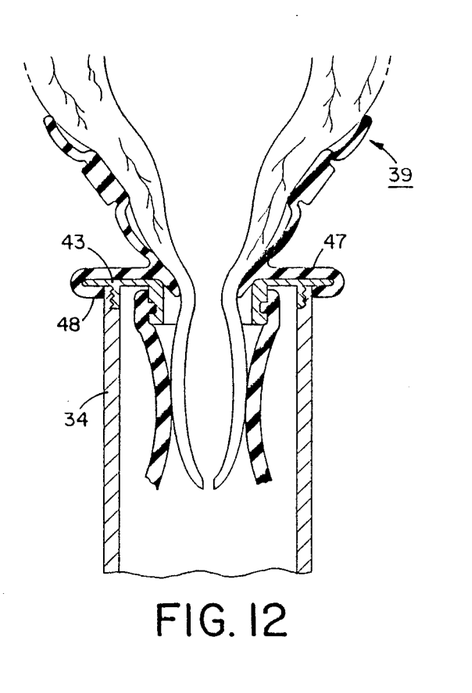

The teat cup embodied in FIG. 11 incorporates a shell 34 having a removable rigid top plate 43 with a circular opening 44 into the interior cavity of the shell. Within the shell, depending from the interior surface of plate 43, is a rigid cylindrical sleeve or ring 46 to which the elastic liner 36 is affixed. Said plate 43 has an outside diameter slightly larger than the cylindrical shell. The conical cup has a horizontal resilient shelf 47 at its narrow end overlying top plate 43, and having an outer diameter slightly greater than said top plate, and is provided with a depending inturned flexible flange 48 embracing the plate rim, which allows the conical portal 39 to be removably secured to the plate 43. The resilient horizontal shelf 47 extends inward as a ring flange 49 within the conical portal and has a smaller circular opening superimposed over the opening in said top plate. The internal diameter of said opening in flange 49 is smaller than the opening in said plate 43. Thus the resilient flange 49 is permitted to deflect flexibly into the opening and conform around the teat upon entry, as shown in FIG. 12, thereby increasing the contact area with the teat over prior art devices, such as the one shown in FIG. 7. The increased surface contact of ring flange 49 with the teat improves the sealing capability of the device, and reduces vacuum leakage around the teat. This reduces premature drop-off of the milking means. Air leakage is commonly associated with mastitis transmission, and a positive animal health result of the improved sealing can thus be achieved.

Figure 9:
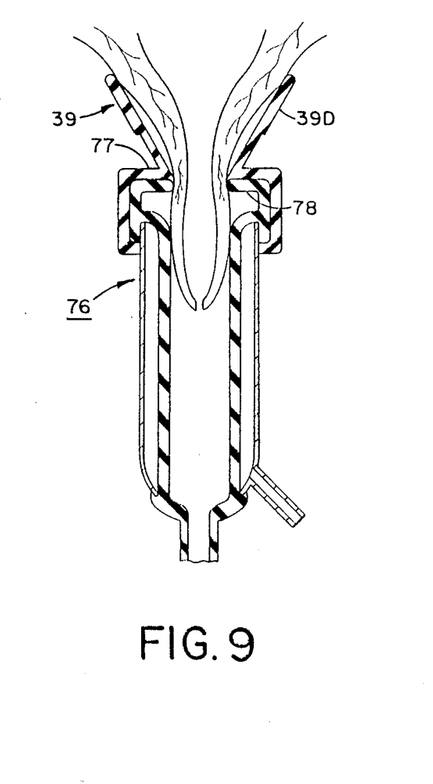

The conical teat entrance portal 39 is made of resilient material, such as the rubber commonly used for inflations. It may be between 1.5" and 4.0" wide at its upper end, and between 0.7 and 1.2" wide at its narrow lower end. As shown in FIGS. 11 and 12, the cone preferably comprises alternating thinner and thicker sections spaced along its anterior or outward facing surface, leaving its inner surface smooth. At the lower end 39A the cone is thin and flexible, allowing the cone to compress downward somewhat on contact with the udder (FIG. 12). At the mid-section is seen a thickened band 39B surmounted by a thinner section 39C at the upper cone end. If desired, the thicker section may extend to the upper cone rim, as shown at 39D in FIGS. 8–10. The thickened section 39B or 39D prevents the cone from completely collapsing on application to the udder, permits the more flexible area 39A or 39C to conform to the udder, as shown in FIG. 12, and enables the cone to return elastically to an upright position after removal from the teat. The conical portal 39 may have a plurality of stiffer and more flexible rings on its anterior surface in a ribbed fashion, or a single flexible lower section with a stiffened upper rim, if desired, as shown in FIGS. 8, 9 and 10.

The conical portal 39 acts as a teat receiver and guide. As the teat enters the enlarged upper end, it is directed along the smooth inner cone surface to slide into the central teat cup liner orifice in plate 43. This action is assisted by the vacuum from vacuum source 67

(FIG. 1) applied to the interior 41 of the liner 36 through the milk discharge tube 38.

Figure 7:
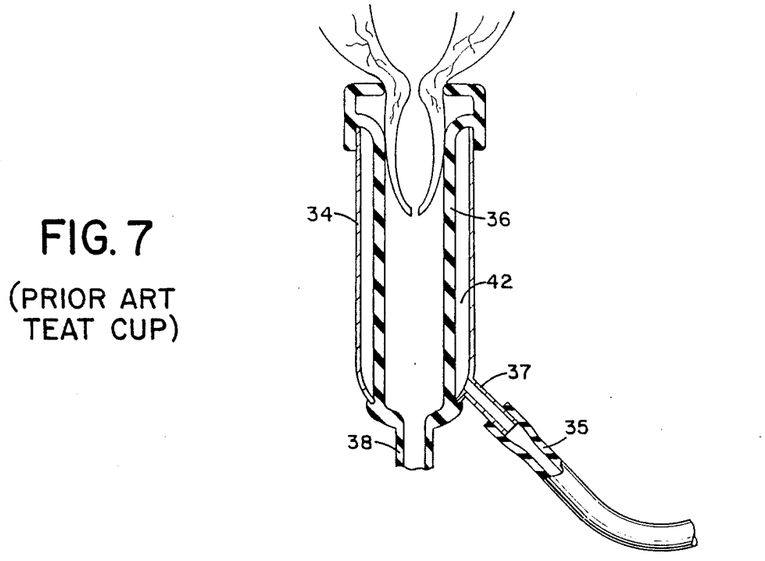
FIG. 7 is an enlarged cross-sectional elevation view of a prior art teat cup engaged on the cow's udder for milking.
Figure 10:
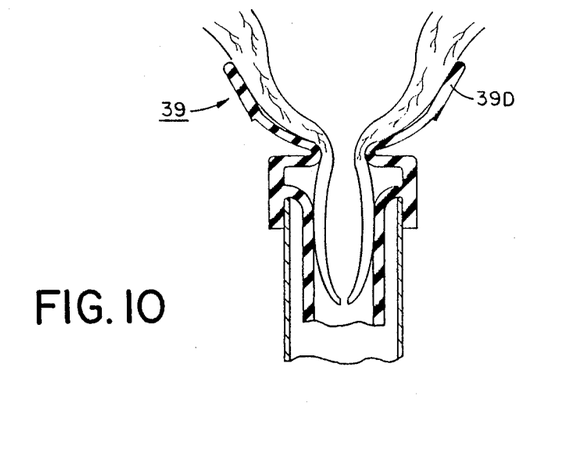

The upper rim of said conical portal 39 engages the udder above and around the teat, as seen in FIGS. 10 and 12, massages the udder and stimulates milk let down, in a manner closely approximating the natural action of a sucking calf. Further, the large conical portal 39 prevents the teat cup 21 from ascending the teat as the udder deflates (FIG. 12) and thereby avoiding restricting milk passage through the lactiferous duct, as can be seen in prior art devices (FIG. 7).

FIG. 9 shows teat cup 76 having an elastic top plate 77, rather than the rigid plate 43 described above. In such embodiments, the elastic plate 77 and liner may be formed together as a single device, as shown in FIGS. 8 and 10. Alternatively, said conical portal 39 can be removably affixed to the elastic horizontal cup top plate 78, as shown in FIG. 9, and is otherwise identical to the device of FIGS. 8 and 10. The thicker encircling rim 39D or rib 39B on the outer surface of conical portal 39 or both may be employed if desired.

Measured from its central axis 29 of revolution, the conical portal preferably converges therewith at an angle A between about 25° and about 45°, as shown in FIG. 8.

FIG. 8 shows a teat cup having a liner 36, top plate 77, and conical entrance portal 39 integrally formed of a single piece of resilient material. In this embodiment, the conical portal 39 may be formed into said resilient top plate 77 so as to extend slightly below the top plate and project into the liner, thereby providing the additional teat contact area described above.

Figure 13:
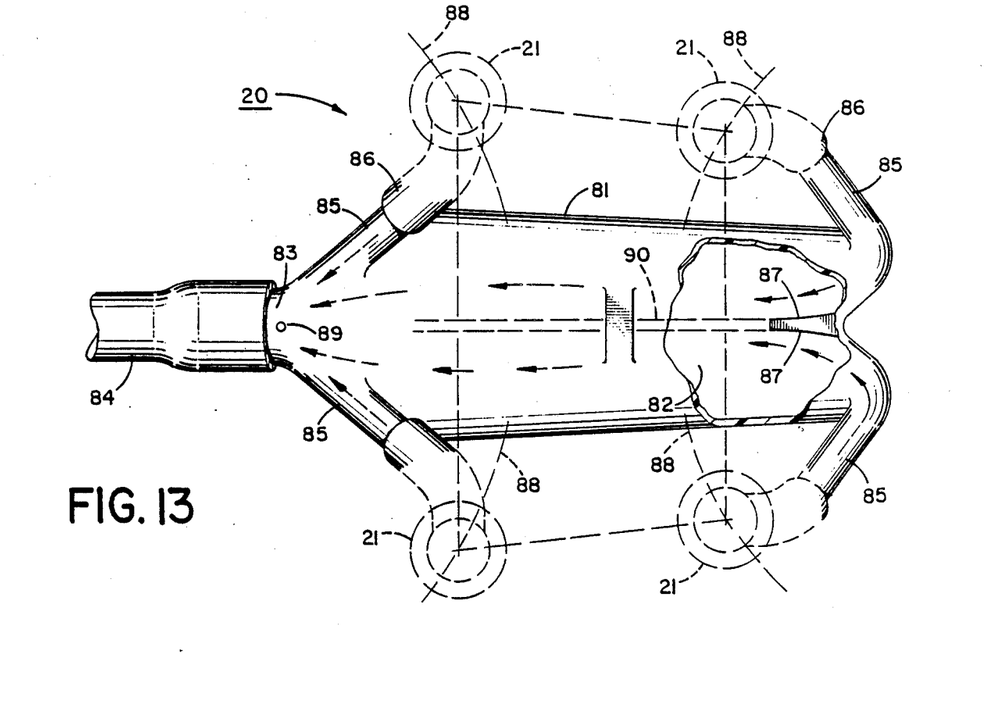
FIG. 13 is a top plan view of the milk collecting "claw" manifold incorporated in the apparatus of the present invention, partially cut-away in section to show its internal construction.
Figure 14:
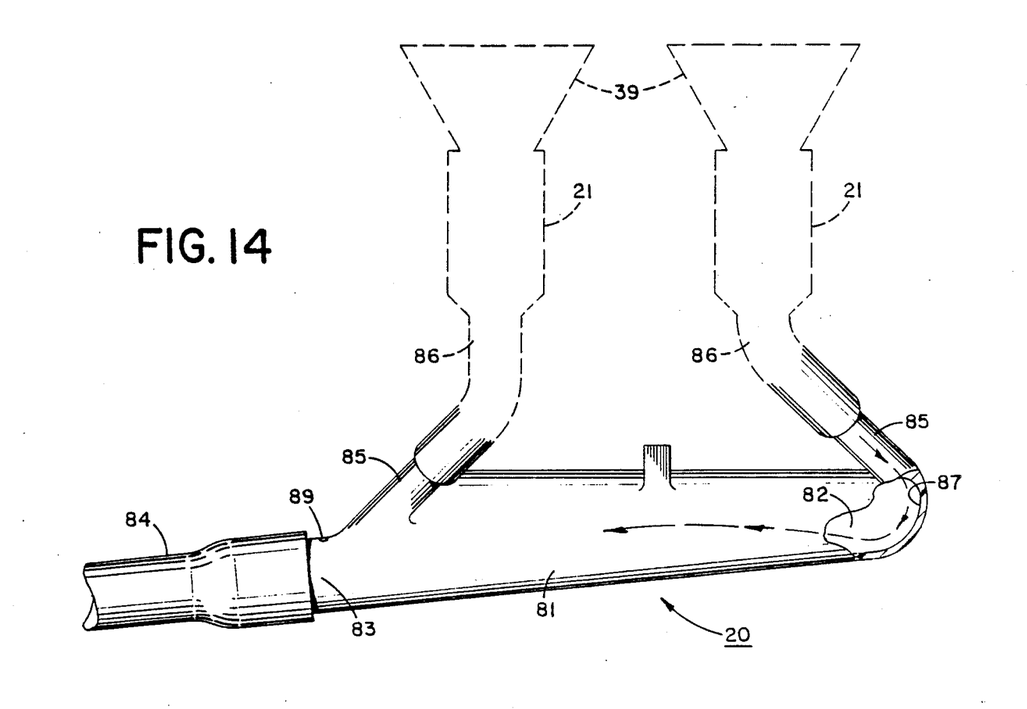
FIG. 14 is a partially cut-away side elevation view of the same claw manifold.

The novel milking manifold means, or "claw" 20 is detailed in FIGS. 13 and 14. It comprises a rigid housing 81 enclosing cylindrical manifold chamber 82, and formed of metal or plastic material. The usual outlet port 83 for connection to a suction hose 84 for milk removal, is formed at the end of housing 81, and four inlet nipples 85 for connection via hoses 86 to the teat cup milk discharge tubes 38 project upward from housing 81. The present invention is characterized by reverse orientation of said inlet nipples 85 as compared to prior art devices.

In general, prior art milk collecting manifolds or "claws" have their inlet nipples disposed on the top or sides in such a manner as to direct the incoming milk in converging streams towards the center of the claw's receiving chamber. The milk there collides and agitates in foaming turbulence, with its energy dissipated in the collision. Hence it does not flow smoothly or quickly into or out of said chamber. The inlets thus protrude radially outward, spread like the talons of a hawk or the claws of a pouncing tiger.

More importantly, this prior art inlet nipple orientation does not permit the teat cups to adjust their positions to various udder sizes or the natural udder development earlier discussed. As the udder expands with growth and increased milk production, the teat cups must be capable of adjusting their positions outward following the teat movement diagonally away from the udder centroid, i.e., they must simultaneously swing to positions both wider laterally and farther longitudinally from the centroid.

Prior art claws cannot accommodate such movement. Hence the prior art teat cups do not hang perpendicular to the horizontal plane, but tend to lean outward. This results in poor vacuum sealing around the teat, air leakage into the teat cup, and premature drop off of the milker. It is believed that the unnatural torquing tension these devices apply to the teat and udder due to their inability to hang squarely on the udder causes the animal discomfort, which results in kicking off the milking means, contributes to uneven udder development, and induces mastitis.

The novel claw shown in FIGS. 13 and 14 has the two forward inlets 85 oriented converging towards the longitudinal centerline of the chamber and aimed towards the outlet 83 of said chamber.

The rear inlets 85 also converge but are disposed in the opposite direction e.g. aimed towards the rear end of said chamber. Milk entering the chamber through the front inlets 85 is immediately evacuated through the outlet port 83. Milk entering through each of the rear inlets 85 contacts a parabolic reflecting or guiding surface 87 which reverses the milk's direction of flow and directs the milk streams down the manifold chamber 82 to the outlet port 83. The reflecting or guiding surface 87 is preferably a smooth paraboloidal, ellipsoidal, hemispherical or similar surface for promoting smooth laminar milk flow. The outlet port 83 may be located on either end of said chamber with the reflector on the opposing end. A central partition 90 may divide the guiding surface 87 into two concavely curved lobes, each receiving the milk stream from one rear inlet 85, and partition 90 may extend along housing 81 toward outlet port 83 if desired.

The housing 81 is such that the outlet end of said chamber 82 is slightly lower than the reflector end 87 when mounted on the udder, to allow gravity to assist in milk removal.

The inlet nipple arrangement illustrated in FIGS. 13 and 14 further permits the preferred adjusting movement of the teat cups 21. Thus, as shown by dashed arcs 88 in FIG. 13, the teat cups 21 can swing wider and simultaneously farther apart longitudinally to conform to the cow's natural udder development. This permits the teat cups 21 to remain substantially perpendicular to the horizon over a broad range of udder sizes without introducing leakage around the teat.

If a rear outlet claw is employed, as shown in FIG. 1, the claw housing 81 of FIG. 13 has its outlet 83 installed at the opposite or rear end of the claw housing. As indicated in FIG. 1, this embodiment re-directs the forward streams of milk toward the rear outlet, where the rearward streams of milk from the rear teat cups converge smoothly and join them with a minimum of foaming turbulence.

The claw 20 may be constructed with a plurality of chambers to receive milk from the various inlets. Further it may have means of removing and applying vacuum to the chamber, such as a turn cock in the outlet port or ball cock which can cover said outlet port on the interior of the chamber. A means of admitting atmospheric air into the chamber, such as a small air vent 89 near outlet 83, may be used to assist in milk extraction and removal, if the teat cups or nipples are not vented, as at vent 28 in FIG. 8, for example.

Figure 15:
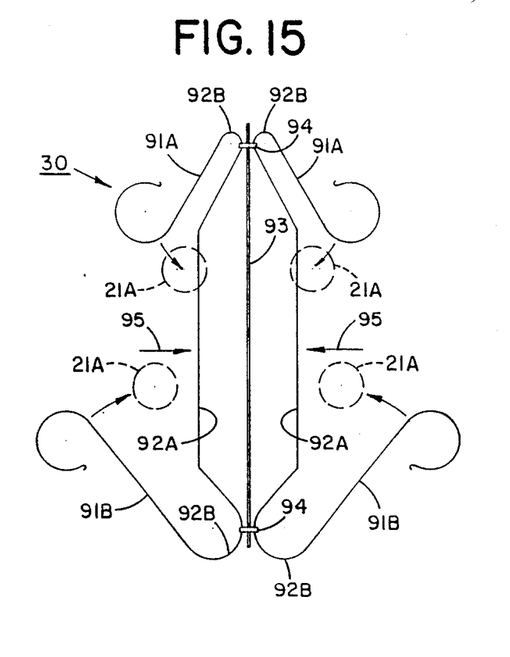
FIG. 15 is a schematic top plan diagram of a teat cup attaching mechanism showing its construction and adjustability.
Figure 16:
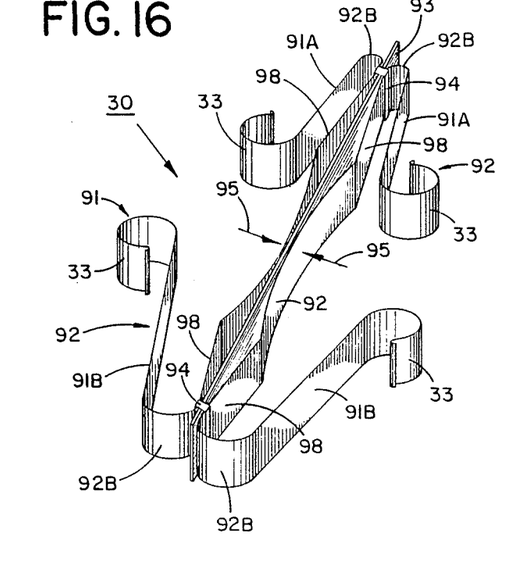
FIG. 16 is a perspective view of the attaching mechanism of FIG. 15, showing its contracted condition with its teat cup axes drawn toward each other.
Figure 17:
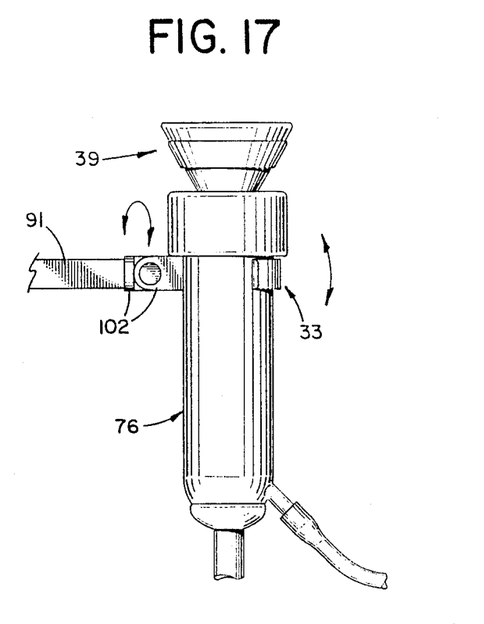
FIG. 17 is a fragmentary side elevation view of the teat cup retaining means incorporated in the apparatus of this invention, connecting the teat cups shown in FIGS. 8 through 14 with the attaching mechanisms of FIGS. 1, 15 and 16.

The teat cup attacher mechanism 30 is detailed in FIGS. 15–21. Said attacher mechanism comprises teat cup retaining means 33, partially surrounding the teat cup shell 34, as seen in FIG. 17, which allows the teat cup to be readily removed.

The retaining means 33 are connected to the outer ends of diagonally converging retainers 91. Both retaining means 33 and each retainer 91 are made of resilient, somewhat elastic materials such as stainless spring steel or relatively rigid plastics, such that the teat cup 21 is maintained upright by means 53 in the desired position, but may be deflected from the vertical and may swing outward or inward in the horizontal plane by pressure from the teats to comply to the teat position and orientation during attachment.

FIG. 17 depicts pivotable joints 102 mounting cups 21 on members 91, preferably resiliently biased toward a center position, which enables the teat cup 21 mounted at the ends of members 91 to partially pivot or rotate in "universal" fashion about a vertical yaw axis through its center. Additional similar pivots may be employed allowing the teat cups 21 in retainers 91 to pivot about horizontal roll or pitch axes. This articulation is beneficial when applying said attaching mechanism to irregular udders having uneven quarters or higher front than rear quarters.

FIGS. 13, 15, 16 and 19–21 illustrate the general trapezoidal arrangement of the teat cups 21 on retainers 91, which conforms to the usual configuration of the teats on the cow's udder. While the trapezoidal relationship of the teats is fairly consistent, it has been observed that the variations may be quite large within a herd, and even for the same animal over time. As the cow matures and passes through successive lactations, the teat positions spread outward diagonally relative to the udder centroid, i.e., the trapezoidal teat pattern expands. During the same lactation period, the udder initially expands when the cow freshens, then gradually contracts over the lactation cycle. Day-to-day variations within the same animal also occur, but are comparatively small. Hence, the teat cup attaching mechanism 30 and teat cups 21 are designed to accommodate a wide range of teat positions.

FIGS. 15, 16, 18 and 19–21 illustrate teat cup attaching mechanism 30 and the adjustment methods which expand and contract the trapezoidal relationship of the teat cups. Retainers 91 swing outward moving teat cups 21 in a generally diagonal, substantially arcuate path.

Figure 18:
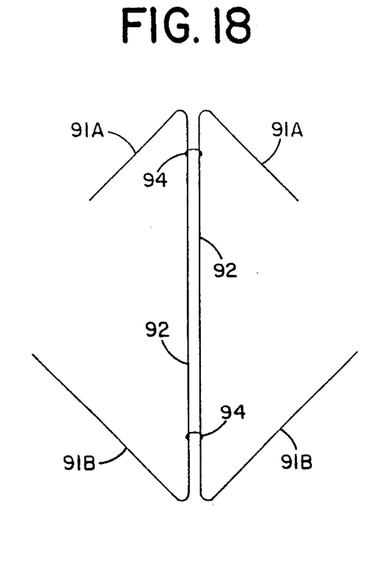
FIG. 18 is a simplified top plan diagram of the resiliently adjustable components of the attaching mechanisms of FIGS. 15 and 16.

The most rudimentary assembly of retainers 91 is shown schematically in FIG. 18, where two thin flat strips 92 of stiff spring steel are linked together vertically edgewise side by side for positioning under the centerline of the cow's udder. The rear ends of strips 92 are bent laterally forward at an acute angle of about 45° to form rear support members 91A. The forward ends of strips 92 are similarly bent laterally rearward to form forward support members 91B. As shown in FIG. 18, the ends of support members 91A and 91B together form a trapezoidal pattern, and the resilient elasticity of retainers 91 promotes automatic self-alignment of cups 21 with overlying teats on the cow's udder.

Several different structures are well adapted to reposition members 91 if desired, causing pivoting movement of cups 21. FIG. 15 shows a concavely arched central span 92A of each of the strips, spaced laterally away from a central longitudinal bar 93 to which strips 92 are loosely linked near the front and rear bent ends by links 94, maintaining their bent ends closely adjacent to bar 93. As the user applies inward forces represented by arrows 95 urging concave strip spans 92A toward each other sandwiching central longitudinal bar 93 between them in the closed position shown in FIG. 16, this movement causes the bent front and rear ends 92B to move apart through links 94, bringing the adjacent ends 98 of concave spans 92A closer together flanking bar 93, and causing both front members 91 to move laterally inward toward each other, while both rear members 91 likewise move laterally inward toward each other, all as indicated in FIG. 16, bringing teat cups 21 to the dash line positions 21A shown in FIG. 15.

Figure 19:
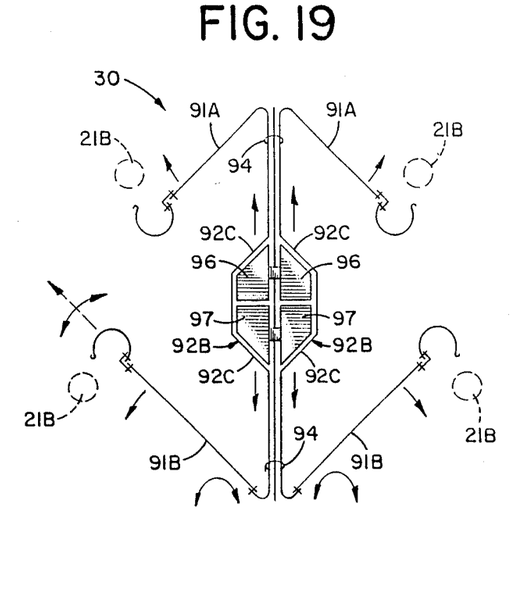
FIG. 19 is a schematic top plan diagram of a modified teat cup attaching mechanism actuated by sliding wedge assemblies to swing the teat cup axes apart to expanded positions.

A different embodiment of spring strips 92 is shown in FIG. 19, with shorter concave central strip spans 92B between links 94 bounded at their forward and rearward ends by camming ramps 92C converging diagonally toward central bar 93. Longitudinally movable forward camming wedges 97 and rearward camming wedges 96 are positioned between ramps 92C and bar 93. As each pair of wedges 96–97 is moved apart, forcing ramps 92C away from bar 93, this forces the short central spans 92B apart, drawing the front and rear ends of strips 92 toward each other, sliding through links 94. This movement causes the teat cups 21 to swing outward, in directions opposite to the movement shown in FIG. 15, bringing the teat cups to an expanded trapezoid position shown in dashed circles 21B in FIG. 19.

The displacing means need not be wedge shaped. Curvilinear, quadri-spherical, or like surfaces may also be used. The displacing means may have a relieved surface which enables it to embrace the bar 93 on two or three sides.

The wedges can be actuated in a variety of ways. Pneumatic cylinders may be employed to push each wedge individually, in tandem, or collectively. Alternatively, the gripping means, acting on a pivotable scissor-like linkage pivotally connected to each pair of said wedges 96 and 97 may provide the camming actuation.

Both the contracting trapezoid support mechanism 30 of FIG. 15 and the expanding trapezoid support mechanism 30 of FIG. 19 preferably employ elongated flat elastic strips 92 positioned vertically on edge flanking a central support bar 93, with their forward and rear ends linked to bar 93 by links 94, permitting sliding movement of the reversely bent ends of the spring strips relative to bar 93. By this means, the teat cups 21 supported at the remote ends of members 91 are held stable in a generally horizontal plane, with the edgewise stiffness of strips 92 resisting vertical sagging deflection. Expansion or contraction of the trapezoidal apex positioning of teat cups 21 in their horizontal plane to comply with udder size variations is facilitated by the resilient flexibility of strips 92. The flexibility of their central concave spans 92A or 92B combines with their sliding linkage mounting in links 94 at both forward and rearward ends of bar 93 to promote adjustability of the trapezoid size upon command.

Figure 20:
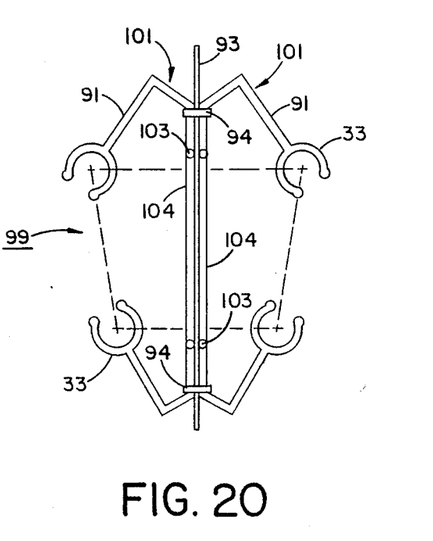
FIGS. 20 and 21 are schematic top plan views of a different embodiment of the attaching mechanism of the invention, respectively showing its contracted and expanded trapezoid configurations.
Figure 21:
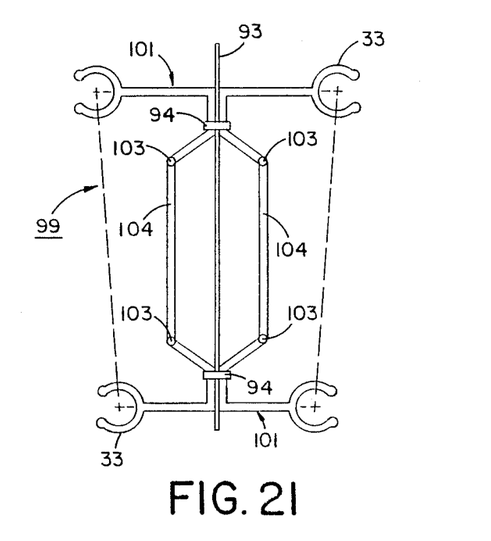

Another embodiment 99 of the adjustable attaching means is shown in FIGS. 20 and 21. There the retainers 91 are formed as legs of U-shaped arms 101 whose opposite legs terminate in pivots 103. On each side of the device, the pair of forward and rearward pivots 103 are joined by an adjusting bar 104. Each linkage 101-103-104-103-101 is slidably joined to the other by a link 94 loosely joining the bases of both front U-shaped arms 101, and a second link 94 loosely joining the bases of both rear U-shaped arms 101. This permits separation of adjusting bars 104 to rock arms 101 about links 94, swinging retainers 91 angularly outward, from the contracted trapezoidal position of FIG. 20 to the expanded trapezoidal position of FIG. 21.

Bars 104 may be rigid, in this embodiment. If the arms 101 are somewhat resilient, this provides flexing compliance of teat cups 21 held in retaining means 33 at the end of retainers 91, to accommodate the cow's teats during attaching engagement.

It will thus be seen that the objects set forth above, and those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An automatic milking unit positioning device mounted on a base at the udder end of a dairy cow milking station, comprising:
   A. an attacher presented toward the udder of a cow to be milked,
   B. manipulator actuation means movably mounted on said base for moving the attacher between a milking position under a cow's udder and a retracted position,
   C. resilient cup support means incorporated in said attacher,
   D. four teat cups adjustably mounted in a trapezoidal pattern in the resilient support means, each having a rigid shell enclosing a flexible internal teat-receiving inflation tube pulsingly expandable and contractable by external pressure or partial vacuum, surmounted by an upwardly open thin-walled flexible conical entrance portal facing a teat,
   E. a milk receiving claw manifold having an outlet port and four inlet nipples each connected by flexible conduit means to the lower end of the inflation tube of one of said teat cups,
   F. delivery conduit means connected to said outlet port for receiving and delivering milk from the outlet port of the claw manifold to a collection point,
   G. a controllable vacuum source for connection to the delivery conduit means, reducing pressure inside the claw manifold and the lower end of the inflation tube for delivering milk to the collection point, and for intermittent pulsing connection to the region inside the shell surrounding the inflation tube, producing pulsing milking expansion and contraction of the inflation tube,
   H. sensing means responsive to the positions of the teat cups and the cow's udder,
   I. and control circuitry means operatively connected to the sensing means, actuating the vacuum source for automatic engagement of the teat cups on the cow's udder, automatic pulsing milking action of the inflation tubes, and automatic collection of the milk delivered therefrom via the claw manifold, and automatic disengagement when the milking operation is completed.

2. The device defined in claim 1, wherein the actuation means includes means for moving the attacher in two directions, a vertical direction, and a longitudinal direction toward and away from the cow to be milked.

3. The device defined in claim 2, wherein the actuation means further includes angular movement means for moving the attacher angularly about a substantially vertical axis.

4. The device defined in claim 1, wherein the sensing means includes sensors responsive to the position of at least two teats of the cow to be milked relative to the attacher whereby the trapezoidal configuration of all four teats can be estimated and the attacher maneuvered by the control circuitry means to position the teat cups in alignment for engagement therewith.

5. The device defined in claim 4, wherein the separation distance between the two teats sensed by the sensing means is reported to the control circuitry means, and the control circuitry means is adapted to adjust the dimensions of the trapezoidal pattern of the teat cup axes in response to said separation distance.

6. The device defined in claim 1, wherein each flexible thin-walled conical entrance portal protrudes upward free-standing for massaging engagement with the cow's udder surrounding the teat received therein.

7. The device defined in claim 1, wherein each flexible conical entrance portal is provided with a smooth interior surface for guiding the teat into engagement within the inflation tube.

8. The device defined in claim 7, wherein the flexible conical entrance portal is provided with wall portions of differing thickness, including at least one thick wall portion maintaining the conical entrance portal against substantial radial deflection, and a thinner wall portion providing resilient vertical and lateral deflectability, permitting the conical entrance portal to collapse partially and embrace flexibly the udder surrounding the engaged teat without climbing or pinching off milk flow, thereby emulating the massaging sucking action of a nursing calf.

9. An automatic milking unit positioning device mounted on a base at the udder end of a dairy cow milking station, comprising:
   A. a gripper presented toward the udder of a cow to be milked,
   B. manipulator actuation means movably mounted on said base for moving the gripper between a milking position under a cow's udder and a retracted position,
   C. an attacher releasably held in the gripper beneath the udder of the cow to be milked having resilient support means,
   D. four teat cups adjustably mounted in a trapezoidal pattern in the resilient support means, each having a rigid shell enclosing a flexible internal teat-receiving inflation tube pulsingly expandable and contractable by external pressure or partial vacuum, surmounted by an upwardly open thin-walled flexible conical entrance portal facing a teat,
   E. a milk receiving claw manifold having an outlet port and four inlet nipples each connected by flexible conduit means to the lower end of the inflation tube of one of said teat cups,
   F. delivery conduit means connected to said outlet port for receiving and delivering milk from the outlet port of the claw manifold to a collection point,
   G. a controllable vacuum source for connection to the delivery conduit means, reducing pressure inside the claw manifold and the lower end of the inflation tube for delivering milk to the collection point, and for intermittent pulsing connection to the region inside the shell surrounding the inflation tube, producing pulsing milking expansion and contraction of the inflation tube,
   H. sensing means responsive to the positions of the teat cups and the cow's udder, I. and control circuitry means operatively connected to the sensing means, actuating the vacuum source for automatic engagement of the teat cups on the cow's udder, automatic pulsing milking action of the inflation tubes, and automatic collection of the milk delivered therefrom via the claw manifold, and automatic disengagement when the milking operation is completed.

10. The device defined in claim 9, wherein the actuation means includes means for moving the gripper in two directions, a vertical direction, and a longitudinal direction toward and away from the cow to be milked.

11. The device defined in claim 10, wherein the actuation means further includes angular movement means for moving the gripper angularly about a substantially vertical axis.

12. The device defined in claim 9, wherein the sensing means includes sensors responsive to the position of at least two teats of the cow to be milked relative to the gripper, whereby the trapezoidal configuration of all four teats can be estimated and the gripper maneuvered by the control circuitry means to position the teat cups in alignment for engagement therewith.

13. The device defined in claim 12, wherein the separation distance between the two teats sensed by the sensing means is reported to the control circuitry means, and the control circuitry means is adapted to adjust the dimensions of the trapezoidal pattern of the teat cup axes in response to said separation distance.

14. The device defined in claim 9, wherein each flexible thin-walled conical entrance portal protrudes upward free-standing for massaging engagement with the cow's udder surrounding the teat received therein.

15. The device defined in claim 9, wherein each flexible conical entrance portal is provided with a smooth interior surface for guiding the teat into engagement within the inflation tube.

16. The device defined in claim 15, wherein the flexible conical entrance portal is provided with wall portions of differing thickness, including at least one thick wall portion maintaining the conical entrance portal against substantial radial deflection, and a thinner wall portion providing resilient vertical and lateral deflectability, permitting the conical entrance portal to collapse partially and embrace flexibly the udder surrounding the engaged teat without climbing or pinching off milk flow, thereby emulating the massaging sucking action of a nursing calf.

17. The positioning unit defined in claim 9, wherein the sensing means include an ultrasonic transmitter and receiver.

18. An automatic milking unit positioning device for attaching milking machines to dairy cows in a plurality of adjacent milking stations, comprising:
A. track means joining a plurality of milking stations each adjacent to one of a corresponding plurality of stalls accommodating cows to be milked,
B. a travelling robotic manipulator movably mounted on said track means for movement between said milking stations, and having an attacher presented toward the udder of cow to be milked, and actuation means for moving the attacher between a milking position under a cow's udder and a retracted position,
C. resilient support means incorporated in said attacher,
D. four teat cups adjustably mounted in a trapezoidal pattern in the resilient support means, each having a rigid shell enclosing a flexible internal teat-receiving inflation tube pulsingly expandable and contractable by external pressure or partial vacuum, surmounted by an upwardly open thin-walled flexible conical entrance portal facing a teat,
E. a milk receiving claw manifold having an outlet port and four inlet nipples each connected by flexible conduit means to the lower end of the inflation tube of one of said teat cups,
F. delivery conduit means connected to said outlet port for receiving and delivering milk from the outlet port of the claw manifold to a collection point.
G. a controllable vacuum source for connection to the delivery conduit means, reducing pressure inside the claw manifold and the lower end of the inflation tube for delivering milk to the collection point, and for intermittent pulsing connection to the region inside the shell surrounding the inflation tube, producing pulsing milking expansion and contraction of the inflation tube,
H. sensing means responsive to the positions of the manipulator and the teat cup cluster and the cow's udder,
I. and control circuitry means operatively connected to the sensing means and to the manipulator, actuating the manipulator and the vacuum source for automatic engagement of the teat cups on the cow's udder, automatic pulsing milking action of the inflation tubes, and automatic collection of the milk delivered therefrom via the claw manifold, and automatic disengagement when the milking operation is completed.

19. An automatic milking unit positioning device for attaching milking machines to dairy cows in a plurality of adjacent milking stations, comprising:
A. track means joining a plurality of milking stations each adjacent to one of a corresponding plurality of stalls accommodating cows to be milked,
B. a travelling robotic manipulator movably mounted on said track means for movement between said milking stations, and having a gripper presented toward the udder of a cow to be milked, and actuation means for moving the gripper between a milking position under a cow's udder and a retracted position,
C. an attacher releasably held in the gripper beneath the udder of the cow to be milked having resilient support means,
D. four teat cups adjustably mounted in a trapezoidal pattern in the resilient support means, each having a rigid shell enclosing a flexible internal teat-receiving inflation tube pulsingly expandable and contractable by external pressure or partial vacuum, surmounted by an upwardly open thin-walled flexible conical entrance portal facing a teat,
E. a milk receiving claw manifold having an outlet port and four inlet nipples each connected by flexible conduit means to the lower end of the inflation tube of one of said teat cups,
F. delivery conduit means connected to said outlet port for receiving and delivering milk from the outlet port of the claw manifold to a collection point,
G. a controllable vacuum source for connection to the delivery conduit means, reducing pressure inside the claw manifold and the lower end of the inflation tube for delivering milk to the collection point, and for intermittent pulsing connection to the region inside the shell surrounding the inflation tube, producing pulsing milking expansion and contraction of the inflation tube, H. sensing means responsive to the positions of the manipulator and the teat cup cluster and the cow's udder, I. and control circuitry means operatively connected to the sensing means and to the manipulator, actuating the manipulator and the vacuum source for automatic engagement of the teat cups on the cow's udder, automatic pulsing milking action of the inflation tubes, and automatic collection of the milk delivered therefrom via the claw manifold, and automatic disengagement when the milking operation is completed.

20. The device defined in claim 19, wherein the track means incorporates at least two elongated rails, and the robotic manipulator is slidingly mounted on the track 21. The device defined in claim 19, wherein the track means incorporates at least two concave flanged tracks, and the robotic manipulator is rollingly engaged for rolling movement along the flanged tracks.

22. The device defined in claim 19, wherein the actuation means includes means for moving the gripper in two directions, a vertical direction, and a longitudinal direction toward and away from the cow to be milked.

23. The device defined in claim 22, wherein the actuation means further includes angular movement means for moving the gripper angularly about a substantially vertical axis.

24. The device defined in claim 19, wherein the sensing means includes sensors responsive to the position of at least two teats of the cow to be milked relative to the gripper, whereby the trapezoidal configuration of all four teats can be estimated and the gripper maneuvered by the control circuitry means to position the teat cups in alignment for engagement therewith.

25. The device defined in claim 24, wherein the separation distance between the two teats sensed by the sensing means is reported to the control circuitry means, and the control circuitry means is adapted to adjust the dimensions of the trapezoidal pattern of the teat cup axes in response to said separation distance.

26. The device defined in claim 19, wherein each flexible thin-walled conical entrance portal protrudes upward free-standing for massaging engagement with the cow's udder surrounding the teat received therein.

27. The device defined in claim 19, wherein each flexible conical entrance portal is provided with a smooth interior surface for guiding the teat into engagement within the inflation tube.

28. The device defined in claim 27, wherein the flexible conical entrance portal is provided with wall portions of differing thickness, including at least one thick wall portion maintaining the conical entrance portal against substantial radial deflection, and a thinner wall portion providing resilient vertical and lateral deflectability, permitting the conical entrance portal to collapse partially and to embrace flexibly the udder surrounding the engaged teat without climbing or pinching off milk flow, thereby emulating the massaging sucking action of a nursing calf.

29. A teat cup attaching means adapted for deployment under the udder of a cow to be milked, and capable of presenting four upright teat cups for engagement on the cow's udder, comprising:

A. a central longitudinal support bar extending forward and rearward beyond both ends of the normal trapezoidal array of teats on the cow's udder, B. a pair of forward support members extending from the forward end of the support bar diagonally rearward and laterally outward, each terminating in a teat cup retaining means, C. a pair of rear support members extending from the rear end of the support bar diagonally forward and laterally outward, each terminating in a teat cup retaining means, D. the support members being relatively rigid vertically to resist downward deflection while simultaneously being relatively flexible laterally to permit lateral deflection, whereby the four teat cups are retained in a cluster at the apices of a generally horizontal trapezoid 30. The teat cup attaching means defined in claim 29, wherein each teat cup is surmounted by an upstanding flexible conical entrance portal, positioned to receive and guide the cow's teats into the teat cups as the cluster support mechanism is raised toward the cow's udder, whereby the reaction force applied by each entering teat acting laterally against its conical entrance portal causes the respective support member to flex laterally into aligned engagement of the teat in the teat cup.

31. The teat cup attaching means defined in claim 29, wherein each teat cup retaining means is pivotally mounted in resiliently biased pivot means at the end of its support member providing flexible adjusted alignment of each teat cup during engagement with the cow's udder.

32. The teat cup attaching means defined in claim 29, wherein the support members are formed as resilient leaf springs of thin band stock having a wide flat cross-section, with the wide dimension positioned vertically while the thin dimension is positioned horizontally.

33. The teat cup attaching means defined in claim 32, wherein the front support member and the rear support member on each side are formed as extensions of a straight central spring strip extending forward and rearward beyond both ends of the normal trapezoidal teat array, and wherein the straight central spring strips are carried together side-by-side.

34. The teat cup attaching means defined in claim 33, wherein the central spring strips are formed with laterally arched central sectors concavely facing each other, and further including means applying lateral force tending to bring said facing sectors together, causing the teat cups to move toward each other forming a smaller trapezoidal configuration.

35. The teat cup attaching means defined in claim 33, wherein the central spring strips are formed with laterally arched central sectors concavely facing each other, and further including means applying lateral force tending to separate said facing sectors, causing the teat cups to move apart forming a larger trapezoidal configuration.

36. The teat cup attaching means defined in claim 35, wherein the lateral force-applying means comprises movable wedge means operatively positioned between the concavely facing arched sectors.

37. A teat cup attaching means adapted for deployment under the udder of a cow to be milked, and capable of presenting four upright teat cups for engagement on the cow's udder, adapted to be supported by movable gripper means raising it into engagement with the cow's udder, and releasing it for milking, comprising:

A. a pair of substantially parallel longitudinally elongated adjusting bars mounted for lateral movement toward and away from each other,
B. a pair of forward U-shaped arms, concavely facing rearward, each having an inner end pivotally joined to the forward end of one adjusting bar and and an outer end spaced laterally outward therefrom provided with teat cup retaining means,
C. a pair of rear U-shaped arms, concavely facing forward, each having an inner end pivotally joined to the rear end of one adjusting bar, and an outer end spaced laterally outward therefrom provided with teat cup retaining means,
D. a forward link movably connecting the forward arms,
E. a rear link movably connecting the rear arms,
F. and adjusting means for changing the lateral spacing between the adjusting bars, thereby moving the U-shaped arms relative to the links to enlarge or reduce the spacing between the teat cups in the retaining means.

38. A claw manifold for incorporation in a milking machine for collecting milk received by four teat cups via hoses and delivering it through an outlet port via a delivery conduit to a collection point, comprising:
    A. a hollow claw housing enclosing a manifold chamber drained through said outlet port at one end of said chamber,
    B. a first pair of nipples, each connected by one said hose to a teat cup, opening into said chamber near said outlet port and oriented to deliver arriving milk streams along angularly converging streamlines toward said outlet port,
    C a second pair of nipples, each connected by one said hose to a teat cup, opening into said chamber at its opposite end and oriented to deliver arriving milk streams along streamlines angularly converging toward said opposite end,
    D. and milk stream deflecting surface means formed in said opposite chamber end receiving the converging milk streams and re-directing them toward said outlet port,
whereby all four arriving milk streams converge at the outlet port in substantially streamline non-turbulent flow, minimizing foaming and turbulence in the milk collected by the claw manifold.

39. The claw manifold defined in claim 38, further incorporating vent means facilitating drainage of milk through the outlet port.

40. The claw manifold defined in claim 38, wherein the deflecting surface means is formed in said opposite end wall of said claw housing.

41. The claw manifold defined in claim 40, wherein said deflecting surface means is divided into two concavely curved lobes.

42. The claw manifold defined in claim 41, wherein said lobes are separated by a partition extending from said opposite housing end toward said outlet port.

43. The claw manifold defined in claim 42, wherein said chamber is divided into two parts over the major part of its length from the opposite end to the outlet port.

44. A method for simultaneously attaching a plurality of milking machine teat cups having upstanding conical entrance portals to the udder of a dairy cow restrained at a milking station, comprising the steps of:
    A. positioning the teat cups in a trapezoidal configuration free for lateral and longitudinal movement in a substantially horizontal plane while resisting displacement in vertical directions,
    B. connecting the teat cups to a vacuum source and to a milk collection point,
    C. raising the plurality of teat cups simultaneously to bring the teat cups into engagement with the cow's teats,
    D. while simultaneously actuating the vacuum source to draw the teat cups into engagement on respective teats, guided by the conical entrance portals slidingly co-acting with the teats and horizontally deflecting the teat cups,
whereby individual manual attachment of each teat cup is avoided by simultaneous elevating self-guided movement of all teat cups into attached position ready for automatic milking to begin.

45. A method for simultaneously attaching a plurality of milking machine teat cups having upstanding conical entrance portals to the udder of a dairy cow restrained at a milking station, comprising the steps of:
    A. mounting the teat cups respectively at the free ends of flexible retainer arms which are relatively free for lateral and longitudinal movement in a substantially horizontal plane while being relatively rigid in resisting displacement in vertical directions,
    B. mounting the opposite ends of the retainer arms in an attacher deployable beneath the cow's udder,
    C. connecting the teat cups to a vacuum source and to a milk collection point,
    D. raising the attacher mounting the retainer arms to bring the teat cups into engagement with the cow's teats,
    E. while simultaneously actuating the vacuum source to draw the teat cups into engagement on respective teats, guided by the conical entrance portals slidingly co-acting with the teats and horizontally deflecting the teat cups by resiliently deflecting the flexible retainer arms horizontally,
whereby individual manual attachment of each teat cup is avoided by simultaneous elevating self-guided movement of all teat cups into attached position ready for automatic milking to begin.

* * * * *